(12) United States Patent
Wang et al.

(10) Patent No.: US 12,438,381 B2
(45) Date of Patent: Oct. 7, 2025

(54) SYSTEMS AND METHODS FOR POWER SHARING RELATED TO MULTIPORT CHARGERS

(71) Applicant: ON-BRIGHT ELECTRONICS (SHANGHAI) CO., LTD., Shanghai (CN)

(72) Inventors: Zhiqiang Wang, Shanghai (CN); Zheng Wang, Shanghai (CN); Xianbing Shi, Shanghai (CN); Changshan Zhang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 46 days.

(21) Appl. No.: 18/111,810

(22) Filed: Feb. 20, 2023

(65) Prior Publication Data

US 2023/0268744 A1    Aug. 24, 2023

(30) Foreign Application Priority Data

Feb. 21, 2022    (CN) .................... 202210157354.1

(51) Int. Cl.
*H02J 7/00* (2006.01)
*H02J 7/02* (2016.01)

(52) U.S. Cl.
CPC ........ *H02J 7/0013* (2013.01); *H02J 7/00034* (2020.01); *H02J 7/0029* (2013.01);
(Continued)

(58) Field of Classification Search
None
See application file for complete search history.

(56) References Cited

U.S. PATENT DOCUMENTS 7,135,836 B2 *  11/2006  Kutkut ............... H02J 7/02
                                                   320/116
9,915,962 B2 *   3/2018  Lee .................. G05F 1/575
(Continued)

FOREIGN PATENT DOCUMENTS

CN        1811743 A      8/2006
CN      103208796 A      7/2013
(Continued)

OTHER PUBLICATIONS

Taiwan Intellectual Property Office, Office Action issued Jan. 7, 2023, in Application No. 110147996.
(Continued)

*Primary Examiner* — Menatoallah Youssef
*Assistant Examiner* — Khareem E Almo
(74) *Attorney, Agent, or Firm* — Faegre Drinker Biddle & Reath LLP

(57) ABSTRACT

USB charging system and method. For example, a USB charging system includes: a first AC-to-DC conversion unit configured to generate a first voltage and a first current; a second AC-to-DC conversion unit configured to generate a second voltage and a second current; a first USB output port corresponding to the first AC-to-DC conversion unit; a second USB output port corresponding to the second AC-to-DC conversion unit; a switch connected to the first AC-to-DC conversion unit and the second AC-to-DC conversion unit; and a control chip connected to the first AC-to-DC conversion unit and the second AC-to-DC conversion unit and configured to open the switch and close the switch; wherein the control chip is further configured to: determine whether the first USB output port is connected to a load device and whether the second USB output port is connected to a load device.

22 Claims, 8 Drawing Sheets

(52) U.S. Cl.
CPC ............ *H02J 7/00714* (2020.01); *H02J 7/02* (2013.01); *H02J 2207/20* (2020.01)

(56) References Cited

U.S. PATENT DOCUMENTS

| | | | |
|---|---|---|---|
| 10,530,108 B2* | 1/2020 | Liu | G05B 15/02 |
| 10,673,256 B2* | 6/2020 | Li | H02J 7/02 |
| 11,169,569 B2* | 11/2021 | Lee | G06F 13/4022 |
| 11,181,966 B2 | 11/2021 | Waters et al. | |
| 11,190,038 B2* | 11/2021 | Jang | H02J 1/102 |
| 11,507,165 B2* | 11/2022 | Walsh | H02J 1/082 |
| 12,072,822 B2* | 8/2024 | Joyce | H02J 3/144 |
| 12,222,891 B2 | 2/2025 | Zhao et al. | |
| 2003/0085622 A1 | 5/2003 | Hailey | |
| 2005/0005045 A1 | 1/2005 | Kim et al. | |
| 2012/0166173 A1* | 6/2012 | Fischbach | H02J 7/0071 703/28 |
| 2013/0151731 A1* | 6/2013 | Lai | H02J 7/00036 710/3 |
| 2013/0234668 A1 | 9/2013 | Kuo et al. | |
| 2016/0352101 A1* | 12/2016 | Koo | H02J 1/12 |
| 2018/0060270 A1 | 3/2018 | Schnell et al. | |
| 2018/0120910 A1 | 5/2018 | Farkas et al. | |
| 2018/0131148 A1* | 5/2018 | Liu | G05B 15/02 |
| 2018/0150121 A1 | 5/2018 | Basterash et al. | |
| 2019/0045654 A1 | 2/2019 | Abbondanzio et al. | |
| 2019/0097527 A1 | 3/2019 | Bhardwaj | |
| 2020/0183471 A1 | 6/2020 | Liu et al. | |
| 2020/0264989 A1 | 8/2020 | Wente et al. | |
| 2020/0327080 A1 | 10/2020 | Sunwoo | |
| 2020/0341936 A1 | 10/2020 | Hsu et al. | |
| 2020/0394150 A1 | 12/2020 | Lanka et al. | |
| 2021/0111578 A1* | 4/2021 | Ou | G06F 1/266 |
| 2021/0397235 A1 | 12/2021 | Schneider | |
| 2022/0052681 A1 | 2/2022 | Jeong | |
| 2022/0137688 A1 | 5/2022 | Wang et al. | |
| 2022/0137690 A1 | 5/2022 | Wang et al. | |
| 2023/0123847 A1 | 4/2023 | Zhao et al. | |
| 2025/0158436 A1 | 5/2025 | Zheng et al. | |

FOREIGN PATENT DOCUMENTS

| | | |
|---|---|---|
| CN | 103309835 A | 9/2013 |
| CN | 104067248 A | 9/2014 |
| CN | 105740193 A | 7/2016 |
| CN | 106230083 A | 12/2016 |
| CN | 210324187 U | 4/2020 |
| CN | 111327091 A | 6/2020 |
| CN | 113285517 A | 8/2021 |
| CN | 213990164 | 8/2021 |
| CN | 114024440 | 2/2022 |
| TW | 200631276 | 9/2006 |
| TW | I648635 B | 1/2019 |
| TW | 201913274 A | 4/2019 |
| TW | 202007045 | 2/2020 |

OTHER PUBLICATIONS

Chen et al., "Design of Multi-Protocol Programmable Input Interface Based on High-Performance Digital Chips," Design and Development of IC in 2008, vol. 33, No. 8, pp. 730-733 (Aug. 2008).

China Patent Office, Office Action issued Dec. 19, 2023, in Application No. 202111199893.3.

China Patent Office, Office Action issued Jun. 13, 2024, in Application No. 202111199893.3.

Taiwan Intellectual Property Office, Office Action issued Dec. 22, 2023, in Application No. 111150735.

Taiwan Intellectual Property Office, Office Action issued Feb. 5, 2024, in Application No. 111123514.

United States Patent and Trademark Office, Office Action mailed Dec. 22, 2023, in U.S. Appl. No. 17/965,647.

United States Patent and Trademark Office, Office Action mailed Jul. 5, 2024, in U.S. Appl. No. 17/965,647.

Wu et al., "A Design of Multi-protocol Serial Communication Interface Based on SP507," World Electronic Components in 2003, pp. 61-64 (Oct. 2003).

Zong et al., "Overview of Power Electronics Based Electrical Energy Router," Proceedings of the CSEE in 2015, vol. 35, No. 18, pp. 4559-4570 (Sep. 20, 2015).

China Patent Office, Office Action issued Apr. 29, 2025, in Application No. 202210157354.1.

* cited by examiner

SYSTEMS AND METHODS FOR POWER SHARING RELATED TO MULTIPORT CHARGERS

1. CROSS-REFERENCES TO RELATED APPLICATIONS

This application claims priority to Chinese Patent Application No. 202210157354.1, filed Feb. 21, 2022, incorporated by reference herein for all purposes.

2. BACKGROUND OF THE INVENTION

Certain embodiments of the present invention are directed to circuits. More particularly, some embodiments of the invention provide systems and methods for power sharing related to multiport chargers. Merely by way of example, some embodiments of the invention have been applied to multiport USB chargers. But it would be recognized that the invention has a much broader range of applicability.

With the increasing number of types of mobile devices, single-port Universal Serial Bus (USB) charging systems often can no longer meet the demand for simultaneous charging of multiple devices. In order to charge multiple mobile devices simultaneously, multiport USB charging systems have emerged on the market.

FIG. 1 is a simplified diagram showing a conventional multiport USB charging system. The multiport USB charging system 100 (e.g., a multiport USB charger) includes an AC-to-DC conversion unit 110, multiple DC-to-DC conversion units $120_1, 120_2, \ldots$, and $120_n$, a control chip 130, and multiple USB output ports $140_1, 140_2, \ldots$, and $140_n$, wherein n is an integer larger than 1. The control chip 130 (e.g., a controller) is connected to each DC-to-DC conversion unit of the multiple DC-to-DC conversion units $120_1, 120_2, \ldots$, and $120_n$ by one or more communication lines.

The AC-to-DC conversion unit 110 receives an alternate current (AC) voltage 190, converts the AC voltage 190 to a direct current (DC) voltage 111, and outputs the DC voltage 111 to each DC-to-DC conversion unit of the multiple DC-to-DC conversion units $120_1, 120_2, \ldots$, and $120_n$. Each DC-to-DC conversion unit of the multiple DC-to-DC conversion units $120_1, 120_2, \ldots$, and $120_n$, under control by the control chip 130, converts the DC voltage 111 to a corresponding DC voltage $121_i$, wherein i is an integer larger than or equal to 1 and smaller than or equal to n. Additionally, the DC-to-DC conversion unit $120_i$ also outputs a current $123_i$, and the current $123_i$ and the DC voltage $121_i$ are received by the USB output port $140_i$, wherein i is an integer larger than or equal to 1 and smaller than or equal to n. For example, the DC-to-DC conversion units $120_1$ sends the DC voltage $121_1$ and the current $123_1$ to the USB output port $140_1$, the DC-to-DC conversion units $120_2$ sends the DC voltage $121_2$ and the current $123_2$ to the USB output port $140_2, \ldots$, and the DC-to-DC conversion units $120_n$ sends the DC voltage $121_n$ and the current $123_n$ to the USB output port $140_n$.

In some examples, the charging system 100 is a two-port USB charging system with a total output power of 60 watts, wherein n is equal to 2. The two-port USB charging system includes the USB output port $140_1$ and the USB output port $140_2$. If the USB output port $140_1$ is connected to a load device (e.g., a mobile device to be charged by the charging system 100) but the USB output port $140_2$ is not connected to any load device, the output power at the USB output port $140_1$ can reach 60 watts. If the USB output port $140_1$ is connected to a load device (e.g., a mobile device to be charged by the charging system 100) and the USB output port $140_2$ is also connected to another load device (e.g., another mobile device to be charged by the charging system 100), the output power at the USB output port $140_1$ can reach only 30 watts and the output power at the USB output port $140_2$ can also reach only 30 watts.

In certain examples, for the two-port USB charging system 100 with a total output power of 60 watts, if the USB output port $140_1$ is connected to a load device (e.g., a mobile device to be charged by the charging system 100) and the USB output port $140_2$ is also connected to another load device (e.g., another mobile device to be charged by the charging system 100), the two-port USB charging system 100, in comparison with a single-port USB charging system, uses one extra DC-to-DC conversion unit, which can reduce the power efficiency by, for example, 8%. Also, the DC-to-DC conversion unit $120_1$ and the DC-to-DC conversion unit $120_2$ each can support an output power of 60 watts, so if the USB output port $140_1$ and the USB output port $140_2$ each can deliver only an output power of 30 watts, the extra power capacity of the DC-to-DC conversion unit $120_1$ and the DC-to-DC conversion unit $120_2$ is wasted.

FIG. 2 is a simplified diagram showing a conventional multiport USB charging system. The multiport USB charging system 200 (e.g., a multiport USB charger) includes multiple AC-to-DC conversion units $210_1, 210_2, \ldots$, and $210_n$, multiple control chips $230_1, 230_2, \ldots$, and $230_n$, multiple USB output ports $240_1, 240_2, \ldots$, and $240_n$, and one or more switches 250, wherein n is an integer larger than 1. For example, the AC-to-DC conversion unit $210_i$ is connected to the USB output port $240_i$ through the control chip $230_i$, wherein i is an integer larger than or equal to 1 and smaller than or equal to n. As an example, each control chip (e.g., the control chip $230_i$) includes a transistor that controls the connection between the corresponding AC-to-DC conversion unit (e.g., the AC-to-DC conversion unit $210_i$) and the corresponding USB output port (e.g., the USB output port $240_i$).

In some examples, the AC-to-DC conversion units $210_1, 210_2, \ldots$, and $210_n$ can form $$\frac{n \times (n-1)}{2}$$

pairs of AC-to-DC conversion units, each pair of AC-to-DC conversion units including two AC-to-DC conversion units, wherein n is an integer larger than 1. For each pair of AC-to-DC conversion units, the two AC-to-DC conversion units are connected by one switch of the one or more switches 250. As an example, the one or more switches 250 include $$\frac{n \times (n-1)}{2}$$

switches, wherein n is an integer larger than 1. In certain examples, the control chips (e.g., controllers) $230_1, 230_2, \ldots$, and $230_n$ can form $$\frac{n \times (n-1)}{2}$$

pairs of control chips, each pair of control chips including two control chips, wherein n is an integer larger than 1. For each pair of control chips, the two control chips are connected to each other by one or more communication lines (e.g., by a bus).

Each AC-to-DC conversion unit $210_i$ receives an AC voltage 290 and converts the AC voltage 290 to a DC voltage $211_i$, wherein i is an integer larger than or equal to 1 and smaller than or equal to n. Additionally, the AC-to-DC conversion unit $210_i$ also outputs a current $213_i$. For example, the AC-to-DC conversion unit $210_i$, under control by a corresponding control chip $230_i$, outputs the DC voltage $211_i$ and the current $213_i$ to a corresponding USB output port $240_i$ or to another USB output port $240_j$ through a switch $250_{ij}$, wherein j is an integer larger than or equal to 1 and smaller than or equal to n, and j is not equal to i. As an example, the AC-to-DC conversion units $210_i$ and $210_j$ are connected by the switch $250_{ij}$. If one or more USB output ports of the multiple USB output ports $240_1$, $240_2$, ..., and $240_n$ are not connected to any load devices, one or more AC-to-DC conversion units corresponding to the one or more USB output ports are connected to one or more additional AC-to-DC conversion units in order to provide power to one or more additional USB output ports that are connected to one or more load devices and corresponding to the one or more additional AC-to-DC conversion units.

In certain examples, the charging system 200 is a two-port USB charging system with a total output power of 60 watts, wherein n is equal to 2. The two-port USB charging system includes the USB output port $240_1$ and the USB output port $240_2$. The AC-to-DC conversion unit $210_1$ and the AC-to-DC conversion unit $210_2$ each can support an output power of 30 watts. If the USB output port $240_1$ is connected to a load device (e.g., a mobile device to be charged by the charging system 200) but the USB output port $240_2$ is not connected to any load device, the output power at the USB output port $240_1$ can reach 60 watts by closing the switch $250_{12}$ to connect the AC-to-DC conversion units $210_1$ and $210_2$. If the USB output port $240_1$ is connected to a load device (e.g., a mobile device to be charged by the charging system 200) and the USB output port $240_2$ is also connected to another load device (e.g., another mobile device to be charged by the charging system 200), the output power at the USB output port $240_1$ can reach 30 watts as provided by the AC-to-DC conversion unit $210_1$, and the output power at the USB output port $240_2$ can also reach 30 watts as provided by the AC-to-DC conversion unit $210_2$.

As shown in FIG. 2, the AC-to-DC conversion unit $210_i$ is connected to the USB output port $240_i$ through the control chip $230_i$, wherein i is an integer larger than or equal to 1 and smaller than or equal to n. After the control chip $230_i$ collects the voltage and/or current information about the corresponding USB output port $240_i$, the control chip $230_i$ interacts with one or more other control chips through one or more communication lines (e.g., by a bus) with several bytes of data exchange. Usually, the multiport USB charging system 200 suffers from slow communication rate, delayed information exchange, and susceptibility to interference. Often, the multiport USB charging system 200 is unable to quickly and accurately regulate the multiple AC-to-DC conversion units $210_1$, $210_2$, ..., and $210_n$ in real time.

FIG. 3 is a simplified diagram showing a conventional two-port USB charging system. The two-port USB charging system 300 (e.g., a two-port USB charger) includes two AC-to-DC conversion units $310_1$ and $310_2$, two control chips $330_1$ and $330_2$, two USB output ports $340_1$ and $340_2$, and a switch 350. As an example, the two-port USB charging system 300 is the same as the multiport USB charging system 200 with n equal to 2.

The AC-to-DC conversion unit $310_1$ is connected to the USB output port $340_1$ through the control chip $330_1$, and the AC-to-DC conversion unit $310_2$ is connected to the USB output port $340_2$ through the control chip $330_2$. The two AC-to-DC conversion units $310_1$ and $310_2$ are connected by the switch 350, and the switch 350 is controlled by the control chips $330_1$ and $330_2$. The two control chips (e.g., controllers) $330_1$ and $330_2$ are connected to each other by one or more communication lines (e.g., by a bus).

The AC-to-DC conversion unit $310_1$ receives an AC voltage 390 and converts the AC voltage 390 to a DC voltage $311_1$, and the AC-to-DC conversion unit $310_2$ receives the AC voltage 390 and converts the AC voltage 390 to a DC voltage $311_2$. For example, the AC-to-DC conversion unit $310_1$, under control by the corresponding control chip $330_1$, outputs the DC voltage $311_1$ and a current $313_1$ to the corresponding USB output port $340_1$ or to another USB output port $340_2$ through the switch 350. As an example, the AC-to-DC conversion unit $310_2$, under control by the corresponding control chip $330_2$, outputs the DC voltage $311_2$ and a current $313_2$ to the corresponding USB output port $340_2$ or to another USB output port $340_1$ through the switch 350.

If the USB output port $340_1$ is connected to a load device (e.g., a mobile device to be charged by the charging system 300) but the USB output port $340_2$ is not connected to any load device, the AC-to-DC conversion unit $310_2$ is connected to the AC-to-DC conversion unit $310_1$ in order to provide power to the USB output port $340_1$ that is connected to the load device. If the USB output port $340_2$ is connected to a load device (e.g., a mobile device to be charged by the charging system 300) but the USB output port $340_1$ is not connected to any load device, the AC-to-DC conversion unit $310_1$ is connected to the AC-to-DC conversion unit $310_2$ in order to provide power to the USB output port $340_{12}$ that is connected to the load device.

Usually, the switch 350 of the two-port USB charging system 300 is open by default. In response, the switch 350 often cannot quickly become closed after one USB output port (e.g., the USB output port $340_1$) of the two USB output ports becomes connected to a load device when the other USB output port (e.g., the USB output port $340_2$) of the two USB output ports remains not connected to any load device, causing a significant voltage drop at the one USB output port (e.g., the USB output port $340_1$) because of unsatisfactory dynamic response of the two-port USB charging system 300.

Hence it is highly desirable to improve the technique for multiport USB chargers.

3. BRIEF SUMMARY OF THE INVENTION

Certain embodiments of the present invention are directed to circuits. More particularly, some embodiments of the invention provide systems and methods for power sharing related to multiport chargers. Merely by way of example, some embodiments of the invention have been applied to multiport USB chargers. But it would be recognized that the invention has a much broader range of applicability.

According to certain embodiments, a USB charging system includes: a first AC-to-DC conversion unit configured to generate a first voltage and a first current; a second AC-to-DC conversion unit configured to generate a second voltage and a second current; a first USB output port corresponding to the first AC-to-DC conversion unit; a second USB output port corresponding to the second AC-to-DC conversion unit; a switch connected to the first AC-to-DC conversion unit and the second AC-to-DC conversion unit; and a control chip connected to the first AC-to-DC conversion unit and the second AC-to-DC conversion unit and configured to open the switch and close the switch; wherein the control chip is further configured to: determine whether the first USB output port is connected to a load device and whether the second USB output port is connected to a load device; if the first USB output port is connected to a load device and the second USB output port is not connected to any load device, sample the first current of the first AC-to-DC conversion unit; determine whether the first current flows out of the first AC-to-DC conversion unit and if the first current flows out of the first AC-to-DC conversion unit, whether the first current is larger than a first predetermined threshold in magnitude; and if the first current flows out of the first AC-to-DC conversion unit and the first current is larger than the first predetermined threshold in magnitude, close the switch.

According to some embodiments, a controller for a USB charging system includes: an output port detection unit configured to determine whether a first USB output port is connected to a load device and whether a second USB output port is connected to a load device, the first USB output port corresponding to a first AC-to-DC conversion unit, the second USB output port corresponding to a second AC-to-DC conversion unit; a sampling unit configured to, if the first USB output port is connected to a load device and the second USB output port is not connected to any load device, sample a first current generated by the first AC-to-DC conversion unit; a power-sharing control unit configured to determine whether the first current flows out of the first AC-to-DC conversion unit and if the first current flows out of the first AC-to-DC conversion unit, whether the first current is larger than a first predetermined threshold in magnitude; a switch management unit configured to, if the first current flows out of the first AC-to-DC conversion unit and the first current is larger than the first predetermined threshold in magnitude, close a switch connected to the first AC-to-DC conversion unit and the second AC-to-DC conversion unit.

According to some embodiments, a method for USB charging includes: determining whether a first USB output port is connected to a load device and whether a second USB output port is connected to a load device, the first USB output port corresponding to a first AC-to-DC conversion unit, the second USB output port corresponding to a second AC-to-DC conversion unit; and if the first USB output port is connected to a load device and the second USB output port is not connected to any load device, sampling a first current generated by the first AC-to-DC conversion unit; determining whether the first current flows out of the first AC-to-DC conversion unit and if the first current flows out of the first AC-to-DC conversion unit, whether the first current is larger than a first predetermined threshold in magnitude; and if the first current flows out of the first AC-to-DC conversion unit and the first current is larger than the first predetermined threshold in magnitude, closing a switch connected to the first AC-to-DC conversion unit and the second AC-to-DC conversion unit.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for power sharing related to multiport chargers. Merely by way of example, some embodiments of the invention have been applied to multiport USB chargers. But it would be recognized that the invention has a much broader range of applicability.

Figure 1:
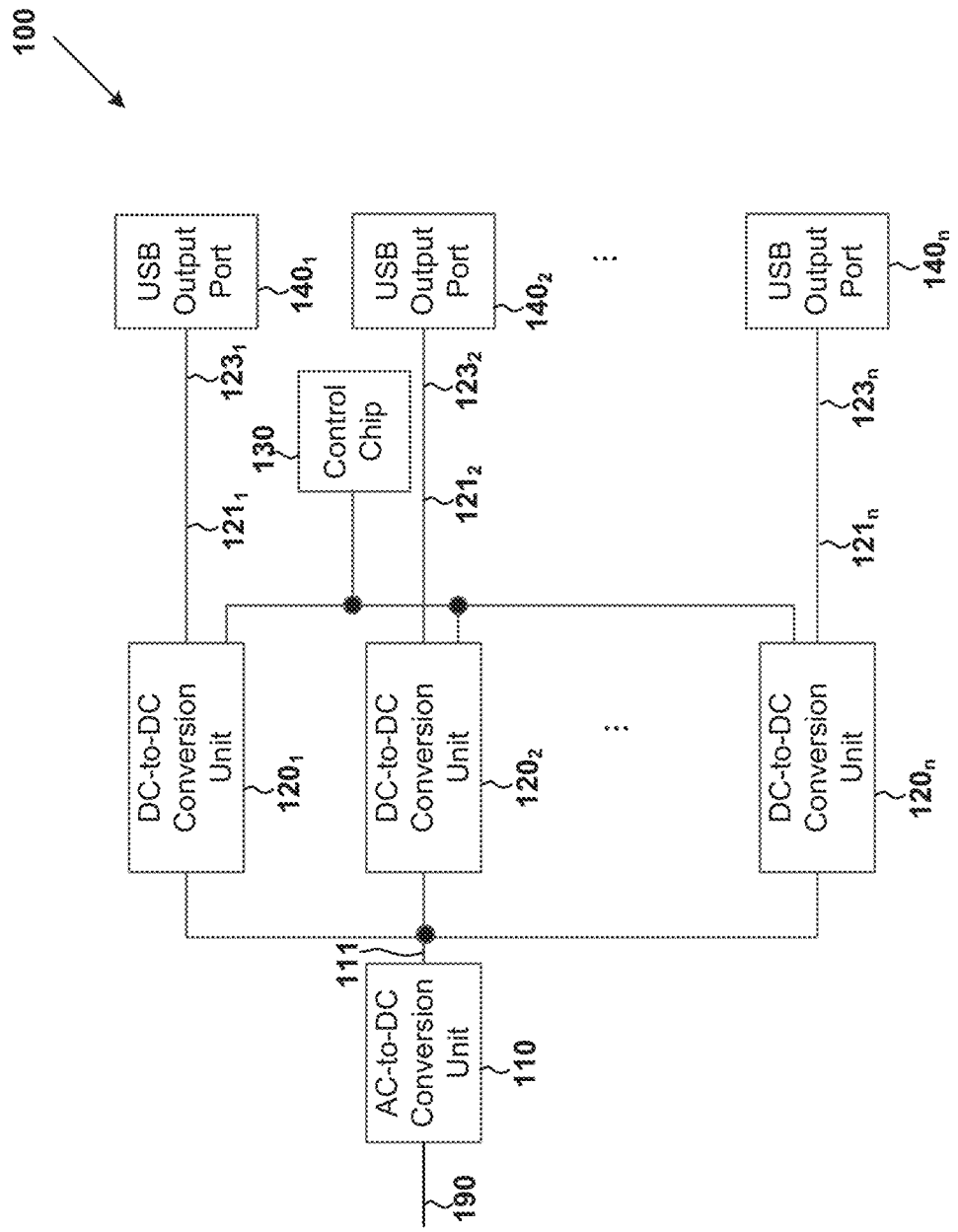
FIG. 1 is a simplified diagram showing a conventional multiport USB charging system.
Figure 2:
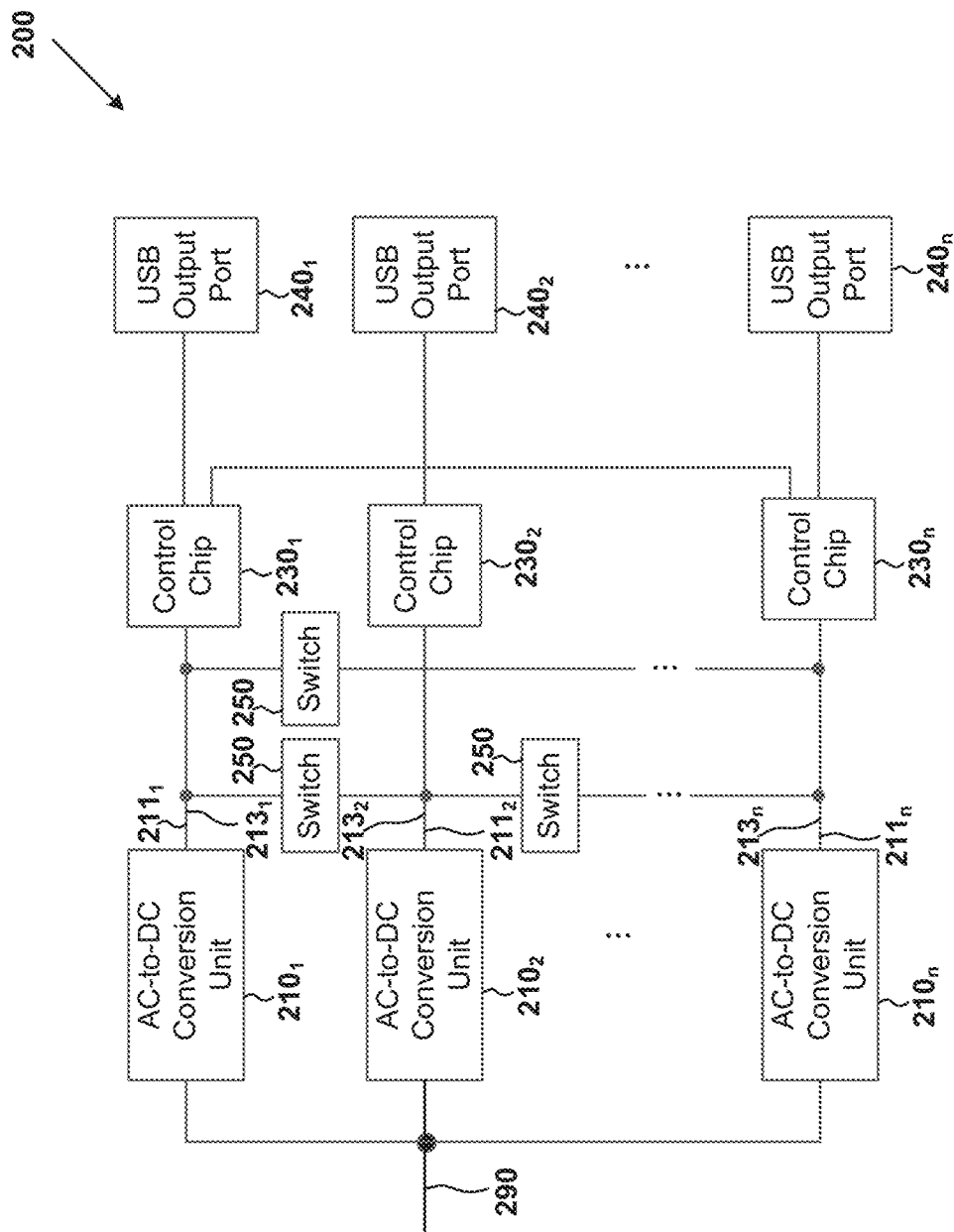
FIG. 2 is a simplified diagram showing a conventional multiport USB charging system.
Figure 3:
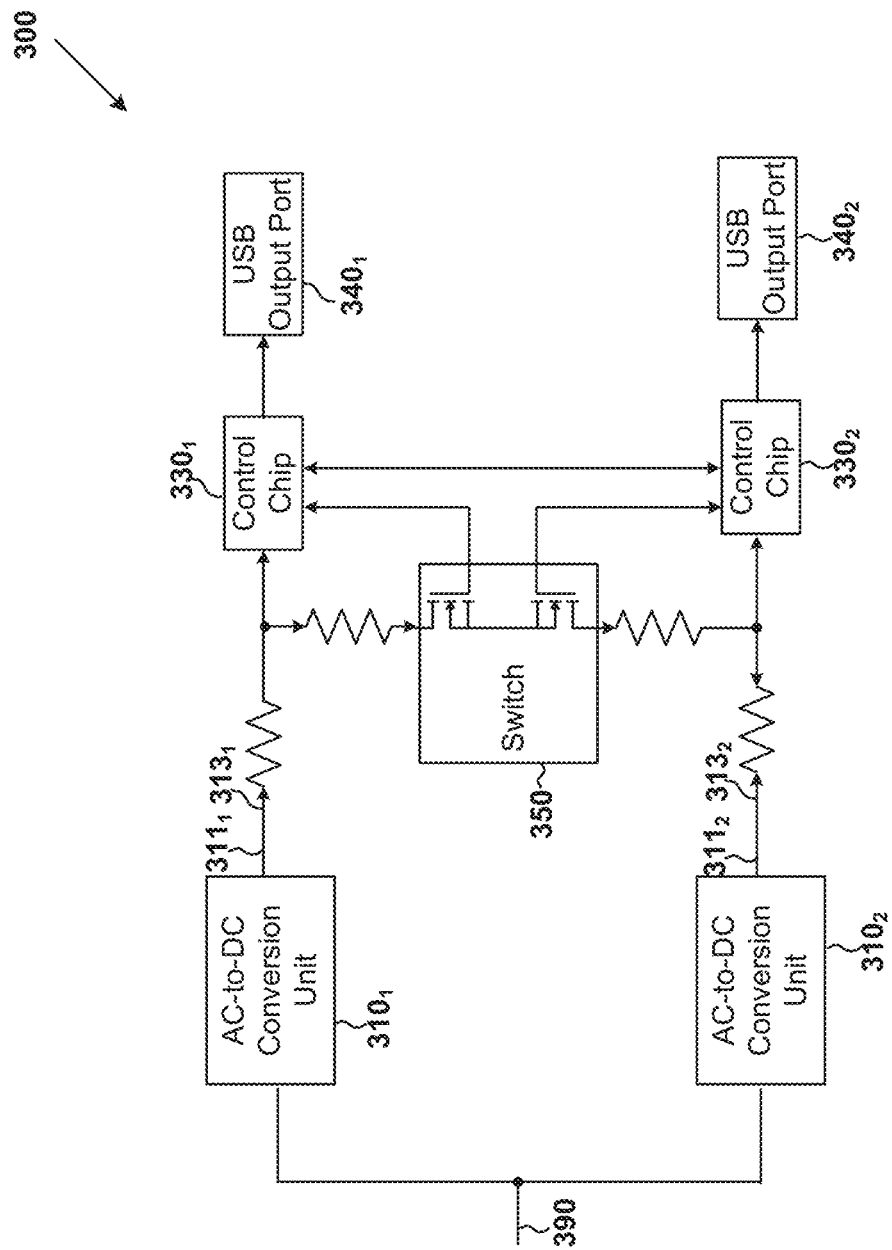
FIG. 3 is a simplified diagram showing a conventional two-port USB charging system.
Figure 4:
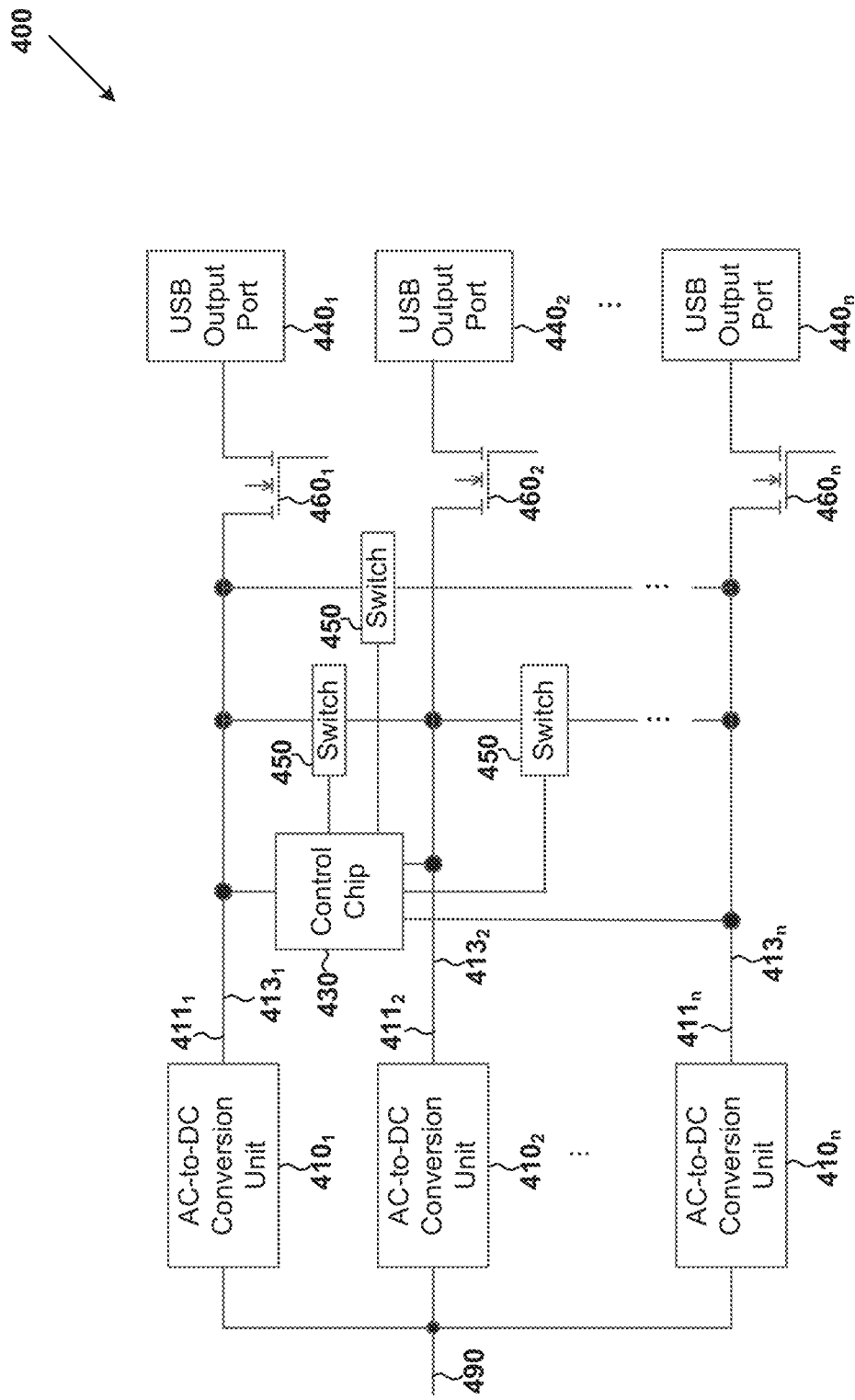
FIG. 4 is a simplified diagram showing a multiport USB charging system according to certain embodiments of the present invention.

FIG. 4 is a simplified diagram showing a multiport USB charging system according to certain embodiments of the present invention. This diagram is merely an example, which should not unduly limit the scope of the claims. One of ordinary skill in the art would recognize many variations, alternatives, and modifications. The multiport USB charging system 400 (e.g., a multiport USB charger) includes multiple AC-to-DC conversion units $410_1$, $410_2$, . . . , and $410_n$, a control chip 430, multiple USB output ports $440_1$, $440_2$, . . . , and $440_n$, one or more switches 450, and multiple transistors $460_1$, $460_2$, . . . , and $460_n$, wherein n is an integer larger than 1. In some examples, the AC-to-DC conversion unit $410_i$ is connected to the USB output port $440_i$ through the transistor $460_i$, wherein i is an integer larger than or equal to 1 and smaller than or equal to n. For example, each USB output port of the multiple USB output ports $440_1$, $440_2$, . . . , and $440_n$ is a USB Type-A connector. As an example, each USB output port of the multiple USB output ports $440_1$, $440_2$, . . . , and $440_n$ is a USB Type-C connector. Although the above has been shown using a selected group of components for the multiport USB charging system 400, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some examples, the AC-to-DC conversion units $410_1$, $410_2$, . . . , and $410_n$ can form $$\frac{n \times (n-1)}{2}$$

pairs of conversion units, each pair of AC-to-DC conversion units including two AC-to-DC conversion units, wherein n is an integer larger than 1. As an example, for each pair of AC-to-DC conversion units, the two AC-to-DC conversion units are connected by one switch of the one or more switches 450. As an example, the one or more switches 450 include $$\frac{n \times (n-1)}{2}$$

switches, wherein n is an integer larger than 1. In certain examples, the control chip 430 (e.g., a controller) is connected to each AC-to-DC conversion unit of the multiple AC-to-DC conversion units $410_1$, $410_2$, ..., and $410_n$, and the control chip 430 is also connected to each switch of the one or more switches 450.

According to some embodiments, each AC-to-DC conversion unit $410_i$ receives an AC voltage 490 and converts the AC voltage 490 to a DC voltage $411_i$, wherein i is an integer larger than or equal to 1 and smaller than or equal to n. For example, the AC-to-DC conversion unit $410_i$ also generates a current $413_i$. As an example, the current $413_i$ flows out of or flows into the AC-to-DC conversion unit $410_i$. In certain examples, the AC-to-DC conversion unit $410_i$, under control by the control chip 430, outputs the DC voltage $411_i$ and the current $413_i$ to a corresponding USB output port $440_i$ or to another USB output port $440_j$ through a switch $450_{ij}$, wherein j is an integer larger than or equal to 1 and smaller than or equal to n, and j is not equal to i. As an example, the AC-to-DC conversion units $410_i$ and $410_j$ are connected by the switch $450_{ij}$. In some examples, if one or more USB output ports of the multiple USB output ports $440_1$, $440_2$, ..., and $440_n$ are not connected to any load devices, one or more AC-to-DC conversion units corresponding to the one or more USB output ports are connected to one or more additional AC-to-DC conversion units through one or more closed switches of the one or more switches 450 in order to provide power to one or more additional USB output ports that are connected to one or more load devices and corresponding to the one or more additional AC-to-DC conversion units. For example, the control chip 430 is used to control the DC voltage $411_i$ and the current $413_i$ generated by the AC-to-DC conversion unit $410_i$, wherein i is an integer larger than or equal to 1 and smaller than or equal to n. As an example, the control chip 430 is used to open and/or close each switch of the one or more switches 450.

According to certain embodiments, if at least one USB output port of the multiple USB output ports $440_1$, $440_2$, ..., and $440_n$ is connected to a load device (e.g., a mobile device to be charged by the charging system 400) and at least one USB output port of the multiple USB output ports $440_1$, $440_2$, ..., and $440_n$ is not connected to any load device, the control chip 430 performs the following processes (e.g., at a set frequency): sampling each current of the currents $413_1$, $413_2$, ..., and $413_n$ of the AC-to-DC conversion units $410_1$, $410_2$, ..., and $410_n$ respectively; determining whether to start a power sharing control based at least in part on the sampled currents for the currents $413_1$, $413_2$, ..., and $413_n$ respectively; and if the power sharing control is determined to start, adjusting the DC voltage $411_i$ and/or the current $413_i$ of at least one AC-to-DC conversion unit of the multiple AC-to-DC conversion units $410_1$, $410_2$, ..., and $410_n$, wherein i is an integer larger than or equal to 1 and smaller than or equal to n.

In some examples, the control chip 430 communicates with one or more load devices that are connected to one or more USB output ports of the multiple USB output ports $440_1$, $440_2$, ..., and $440_n$, through a fast charging protocol in order to determine the output power of each AC-to-DC conversion unit of the multiple AC-to-DC conversion units $410_1$, $410_2$, ..., and $410_n$. For example, the control chip 430 controls the output power of each AC-to-DC conversion unit of the multiple AC-to-DC conversion units $410_1$, $410_2$, ..., and $410_n$ (e.g., by using a constant current mode and/or a constant voltage mode). As an example, the output power is intelligently provided to each USB output port of the one or more USB output ports that are connected to the one or more load devices respectively according to the power demand of the one or more load devices respectively.

In some embodiments, if the control chip 430 detects that a current $413_m$ flows out of a corresponding AC-to-DC conversion unit $410_m$ and the magnitude of the current $413_m$ is larger than a first predetermined threshold, the control chip 430 closes, among the one or more switches 450, at least one switch that connects another AC-to-DC conversion unit $410_q$ to the AC-to-DC conversion unit $410_m$, wherein the AC-to-DC conversion unit $410_q$ corresponds to the USB output port $440_q$ that is not connected to any load device, m is an integer larger than or equal to 1 and smaller than or equal to n, q is also an integer larger than or equal to 1 and smaller than or equal to n, and q is not equal to m. For example, the control chip 430 closes, among the one or more switches 450, at least one switch that connects another AC-to-DC conversion unit $410_q$ to the AC-to-DC conversion unit $410_m$ in order to reduce the magnitude of the current $413_m$ that flows out of the AC-to-DC conversion unit $410_m$.

In certain embodiments, if the control chip 430 detects that a current $413_k$ flows out of a corresponding AC-to-DC conversion unit $410_k$ but the magnitude of the current $413_k$ is smaller than a second predetermined threshold or detects that the current $413_k$ flows into the corresponding AC-to-DC conversion unit $410_k$, the control chip 430 opens, among the one or more switches 450, all one or more switches that are connected to the AC-to-DC conversion unit $410_k$, wherein k is an integer larger than or equal to 1 and smaller than or equal to n. For example, the second predetermined threshold is smaller than the first predetermined threshold. As an example, the control chip 430 opens, among the one or more switches 450, all the one or more switches that are connected to the AC-to-DC conversion unit $410_k$ in order to prevent and/or stop the current backflow into the AC-to-DC conversion unit $410_k$. For example, the control chip 430 opens, among the one or more switches 450, all the one or more switches that are connected to the AC-to-DC conversion unit $410_k$ in order to prevent and/or stop the open-loop abnormality for the AC-to-DC conversion unit $410_k$.

FIG. 5A, FIG. 5B, FIG. 5C and FIG. 5D are simplified diagrams showing one switch of the one or more switches 450 as part of the multiport USB charging system 400 as shown in FIG. 4 according to some embodiments of the present invention. These diagrams are merely examples, which should not unduly limit the scope of the claims. One of ordinary skill in the art would recognize many variations, alternatives, and modifications.

Figure 5D:
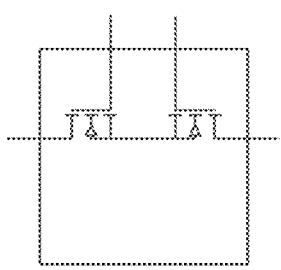
FIG. 5A, FIG. 5B, FIG. 5C and FIG. 5D are simplified diagrams showing one switch of the one or more switches as part of the multiport USB charging system as shown in FIG. 4 according to some embodiments of the present invention.
Figure 5C:
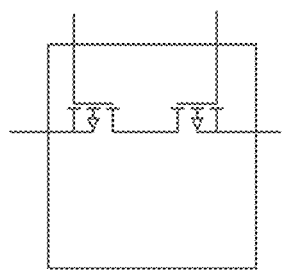
Figure 5B:
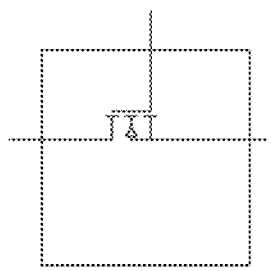
Figure 5A:
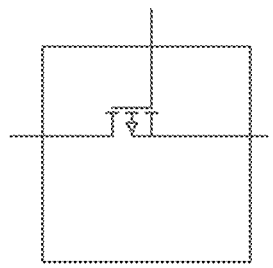

As shown in FIG. 5A, the one switch of the one or more switches 450 includes common-source back-to-back N-channel MOSFETS according to certain embodiments. As shown in FIG. 5B, the one switch of the one or more switches 450 includes common-drain back-to-back P-channel MOSFETS according to some embodiments. As shown in FIG. 5C, the one switch of the one or more switches 450 includes an N-channel MOSFET according to certain embodiments. As shown in FIG. 5D, the one switch of the one or more switches 450 includes a P-channel MOSFET according to some embodiments.

Figure 6:
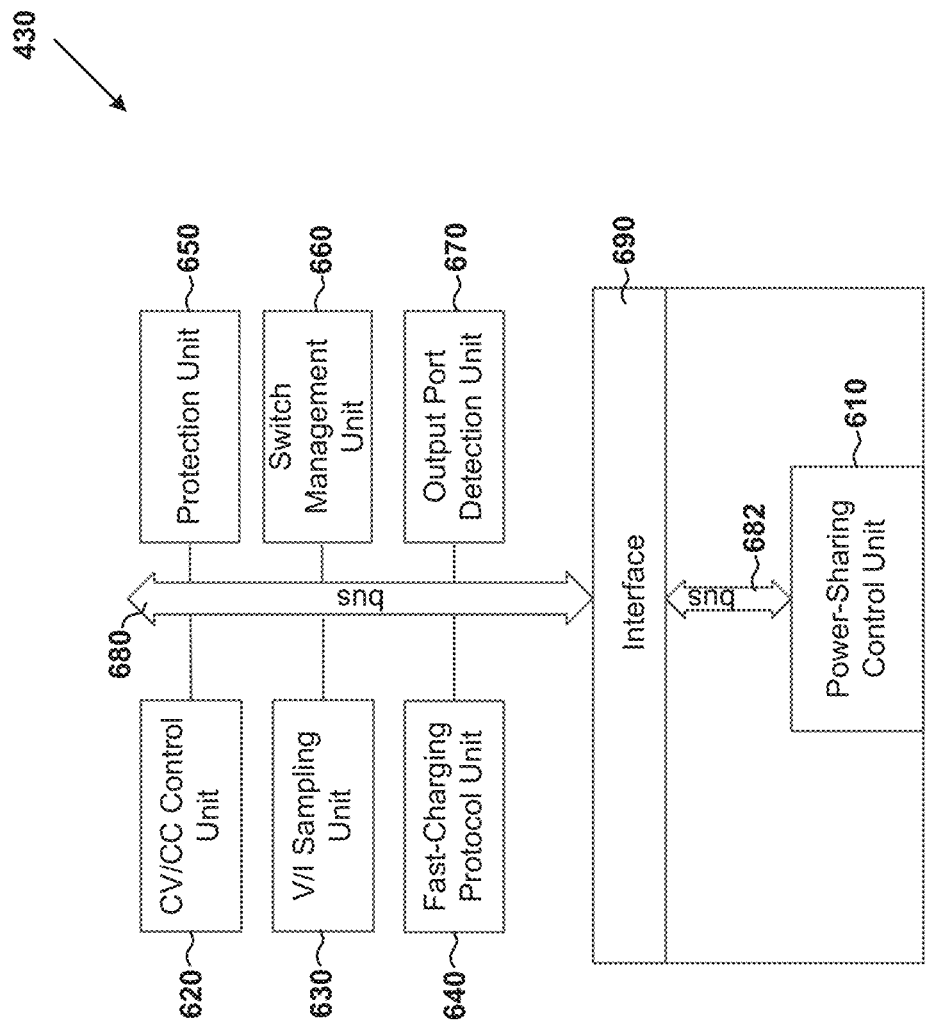
FIG. 6 is a simplified diagram showing the control chip as part of the multiport USB charging system as shown in FIG. 4 according to certain embodiments of the present invention.

FIG. 6 is a simplified diagram showing the control chip 430 as part of the multiport USB charging system 400 as shown in FIG. 4 according to certain embodiments of the present invention. These diagrams are merely examples, which should not unduly limit the scope of the claims. One of ordinary skill in the art would recognize many variations, alternatives, and modifications. The control chip 430 includes a power-sharing control unit 610, a constant-voltage and/or constant-current control unit 620, a voltage and/or current sampling unit 630, a fast-charging protocol unit 640, a protection unit 650, a switch management unit 660, an output port detection unit 670, buses 680 and 682, and an interface 690. Although the above has been shown using a selected group of components for the control chip 430, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to some embodiments, the constant-voltage and/or constant-current control unit 620, the voltage and/or current sampling unit 630, the fast-charging protocol unit 640, the protection unit 650, the switch management unit 660 and the output port detection unit 670 are connected to the bus 680, and the power-sharing control unit 610 is connected to the bus 682. For example, the bus 680 and the bus 682 are connected to each other through the interface 690.

According to certain embodiments, the constant-voltage and/or constant-current control unit 620, the voltage and/or current sampling unit 630, the fast-charging protocol unit 640, the protection unit 650, the switch management unit 660 and the output port detection unit 670 work together under control of the power-sharing control unit 610. In some examples, the constant-voltage and/or constant-current control unit 620 (e.g., an output control unit) is configured to perform constant voltage control and/or constant current control in order to control the output power (e.g., the DC voltage $411_i$ multiplied by the current $413_i$) of each AC-to-DC conversion unit (e.g., the AC-to-DC conversion unit 410 of the multiple AC-to-DC conversion units $410_1$, $410_2$, ..., and $410_n$. For example, the constant-voltage and/or constant-current control unit 620 (e.g., an output control unit) is configured to adjust a DC voltage (e.g., the DC voltage $411_i$) and/or a current (e.g., the current $413_i$) of each AC-to-DC conversion unit (e.g., the AC-to-DC conversion unit 410 of the multiple AC-to-DC conversion units $410_1$, $410_2$, ..., and $410_n$. As an example, the voltage and/or current sampling unit 630 is configured to sample the voltage (e.g., the DC voltage $411_i$) and/or the current (e.g., the current $413_i$) of each AC-to-DC conversion unit (e.g., the AC-to-DC conversion unit $410_1$) of the multiple AC-to-DC conversion units $410_1$, $410_2$, ..., and $410_n$. In certain examples, the fast-charging protocol unit 640 is configured to communicate with one or more load devices that are connected to one or more USB output ports of the multiple USB output ports $440_1$, $440_2$, ..., and $440_n$ in order to determine the output power of each AC-to-DC conversion unit of the multiple AC-to-DC conversion units $410_1$, $410_2$, ..., and $410_n$. In some examples, the protection unit 650 is configured to prevent and/or stop the current from backflowing into (e.g., prevent and/or stop the current $413_i$ from flowing into) any AC-to-DC conversion unit (e.g., the AC-to-DC conversion unit 410 of the multiple AC-to-DC conversion units $410_1$, $410_2$, ..., and $410_n$. For example, if a current $413_k$ flows out of a corresponding AC-to-DC conversion unit $410_k$ but the magnitude of the current $413_k$ is smaller than the second predetermined threshold or if the current $413_k$ flows into the corresponding AC-to-DC conversion unit $410_k$, the protection unit 650 sends a control signal to the switch management unit 660 to open, among the one or more switches 450, all one or more switches that are connected to the AC-to-DC conversion unit $410_k$, wherein k is an integer larger than or equal to 1 and smaller than or equal to n. As an example, the switch management unit 660 is configured to open and/or close each switch of the one or more switches 450. In certain examples, the output port detection unit 670 is configured to determine, for each USB output port (e.g., the USB output port 440 of the multiple USB output ports $440_1$, $440_2$, ..., and $440_n$, whether or not the USB output port (e.g., the USB output port $440_i$) is connected to a load device (e.g., a mobile device to be charged by the charging system 400).

In some embodiments, the power-sharing control unit 610 detects whether a current $413_m$ flows out of a corresponding AC-to-DC conversion unit $410_m$ and the magnitude of the current $413_m$ is larger than the first predetermined threshold, and/or detects whether a current $413_k$ flows into a corresponding AC-to-DC conversion unit $410_k$ and if the current $413_k$ flows out of the corresponding AC-to-DC conversion unit $410_k$, whether the magnitude of the current $413_k$ is smaller than the second predetermined threshold.

Figure 7:
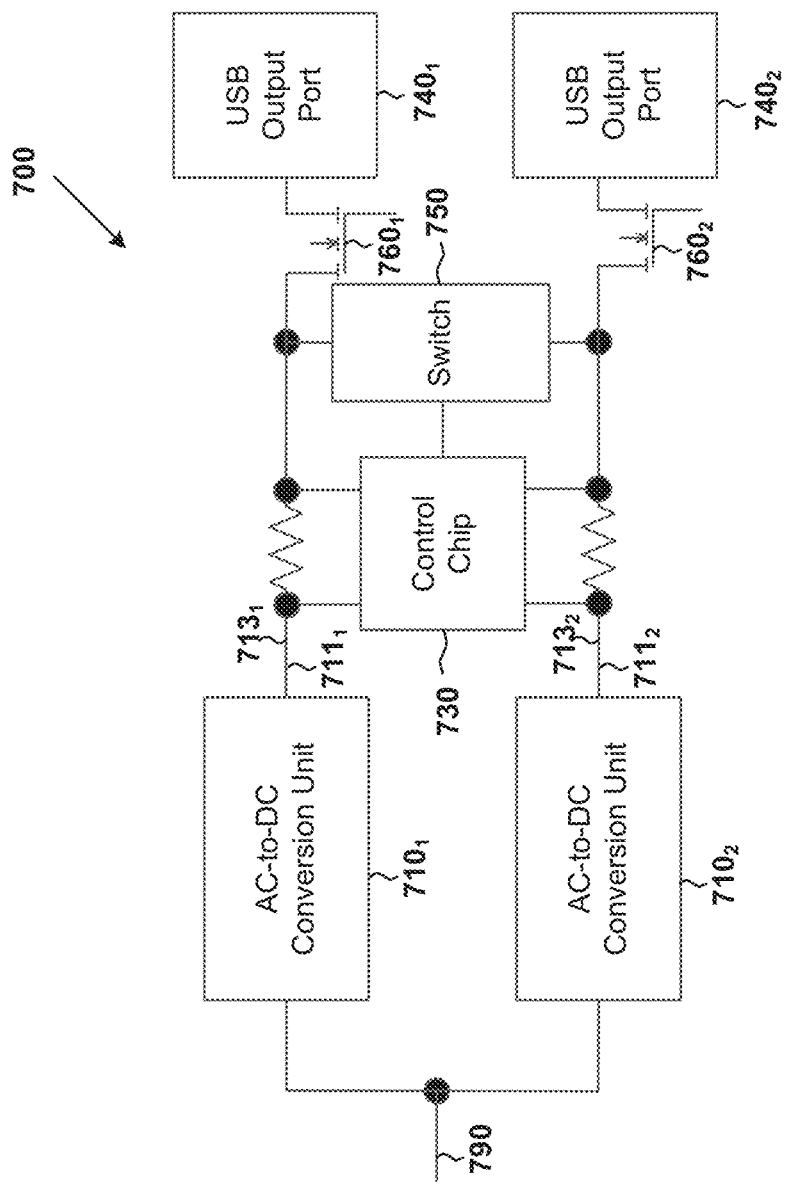
FIG. 7 is a simplified diagram showing a two-port USB charging system according to certain embodiments of the present invention.

FIG. 7 is a simplified diagram showing a two-port USB charging system according to certain embodiments of the present invention. This diagram is merely an example, which should not unduly limit the scope of the claims. One of ordinary skill in the art would recognize many variations, alternatives, and modifications. The two-port USB charging system 700 (e.g., a two-port USB charger) includes two AC-to-DC conversion units $710_1$ and $710_2$, a control chip 730, two USB output ports $740_1$ and $740_2$, a switch 750, and two transistors $760_1$ and $760_2$. As an example, the two-port USB charging system 700 is the same as the multiport USB charging system 400 with n equal to 2. Although the above has been shown using a selected group of components for the two-port USB charging system 700, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some examples, the AC-to-DC conversion unit $710_1$ is connected to the USB output port $740_1$ through the transistor $760_1$, and the AC-to-DC conversion unit $710_2$ is connected to the USB output port $740_2$ through the transistor $760_2$. For example, the two USB output ports $740_1$ and $740_2$ each are a USB Type-A connector. As an example, the two USB output ports $740_1$ and $740_2$ each are a USB Type-C connector. In certain examples, the two AC-to-DC conversion units $710_1$ and $710_2$ are connected by the switch 750. For example, the AC-to-DC conversion unit $710_1$ is connected (e.g., directly or indirectly) to the switch 750, and the AC-to-DC conversion unit $710_2$ is connected (e.g., directly or indirectly) to the switch 750. As an example, the control chip 730 (e.g., a controller) is connected (e.g., directly or indirectly) to the AC-to-DC conversion unit $710_1$ and the AC-to-DC conversion unit $710_2$, and the control chip 730 is also connected (e.g., directly or indirectly) to the switch 750.

According to some embodiments, the AC-to-DC conversion unit $710_1$ receives an AC voltage 790 and converts the AC voltage 790 to a DC voltage $711_1$, and the AC-to-DC conversion unit $710_2$ receives the AC voltage 790 and converts the AC voltage 790 to a DC voltage $711_2$. For example, the AC-to-DC conversion unit $710_1$ also generates a current $713_1$, which flows out of or flows into the AC-to-DC conversion unit $710_1$. As an example, the AC-to-DC conversion unit $710_2$ also generates a current $713_2$, which flows out of or flows into the AC-to-DC conversion unit $710_2$. In certain examples, the AC-to-DC conversion unit $710_1$, under control by the control chip 730, outputs the DC voltage $711_1$ and the current $713_1$ to the USB output port $740_1$ or to the USB output port $740_2$ through the switch 750. In some examples, the AC-to-DC conversion unit $710_2$, under control by the control chip 730, outputs the DC voltage $711_2$ and the current $713_2$ to the USB output port $740_2$ or to the USB output port $740_1$ through the switch 750.

For example, if the USB output port $740_1$ is connected to a load device but the USB output port $740_2$ is not connected to any load device, the AC-to-DC conversion unit $710_2$ is connected to the AC-to-DC conversion unit $710_1$ with the switch 750 closed, in order to provide power to the USB output port $740_1$ that is connected to a load device. As an example, if the USB output port $740_2$ is connected to a load device but the USB output port $740_1$ is not connected to any load device, the AC-to-DC conversion unit $710_1$ is connected to the AC-to-DC conversion unit $710_2$ with the switch 750 closed, in order to provide power to the USB output port $740_2$ that is connected to a load device. In some examples, the control chip 730 is configured to control the DC voltage $711_1$ and the current $713_1$ of the AC-to-DC conversion unit $710_1$ and is also configured to control the DC voltage $711_2$ and the current $713_2$ of the AC-to-DC conversion unit $710_2$. In certain examples, the control chip 730 is configured to open and/or close the switch 750.

According to certain embodiments, if one USB output port of the two USB output ports $740_1$ and $740_2$ is connected to a load device (e.g., a mobile device to be charged by the charging system 700) and the other USB output port of the two USB output ports $740_1$ and $740_2$ is not connected to any load device, the control chip 730 performs the following processes (e.g., at a set frequency): sampling the current $713_1$ of the AC-to-DC conversion unit $710_1$ and the current $713_2$ of the AC-to-DC conversion unit $710_2$; determining whether to start a power sharing control based at least in part on the sampled current for the current $713_1$ and the sampled current for the current $713_2$; and if the power sharing control is determined to start, adjusting the DC voltage $711_1$ and/or the current $713_1$ of the AC-to-DC conversion unit $710_1$ and/or the DC voltage $711_2$ and/or the current $713_2$ of the AC-to-DC conversion unit $710_2$.

In some examples, the control chip 730 communicates with one or two load devices that are connected to one or two USB output ports of the two USB output ports $740_1$ and $740_2$, through a fast charging protocol in order to determine the output power of the AC-to-DC conversion unit $710_1$ and/or the output power of the AC-to-DC conversion unit $710_2$. For example, the control chip 730 controls the output power of the AC-to-DC conversion unit $710_1$ and/or the output power of the AC-to-DC conversion unit $710_2$ (e.g., by using a constant current mode and/or a constant voltage mode). As an example, the output power is intelligently provided to the USB output port $740_1$ according to the power demand of a load device if the USB output port $740_1$ is connected to the load device, and/or the output power is intelligently provided to the USB output port $740_2$ according to the power demand of a load device if the USB output port $740_2$ is connected to the load device.

In some embodiments, the USB output port $740_1$ is connected to a load device, and the USB output port $740_2$ is not connected to any load device. In certain examples, if the control chip 730 detects that the current $713_1$ flows out of the AC-to-DC conversion unit $710_1$ and the magnitude of the current $713_1$ is larger than a first predetermined threshold, the control chip 730 closes the switch 750. For example, the control chip 730 closes the switch 750 so that the AC-to-DC conversion unit $710_2$ also provides power to the USB output port $740_1$. As an example, the control chip 730 closes the switch 750 in order to reduce the magnitude of the current $713_1$ that flows out of the AC-to-DC conversion unit $710_1$. In some examples, if the control chip 730 detects that the current $713_2$ flows out of the AC-to-DC conversion unit $710_2$ but the magnitude of the current $713_2$ is smaller than a second predetermined threshold or detects that the current $713_2$ flows into the AC-to-DC conversion unit $710_2$, the control chip 730 opens the switch 750. For example, the second predetermined threshold is smaller than the first predetermined threshold. As an example, the control chip 730 opens the switch 750 in order to prevent and/or stop the current backflow into the AC-to-DC conversion unit $710_2$, and/or to prevent and/or stop the open-loop abnormality for the AC-to-DC conversion unit $710_2$.

According to some embodiments, the USB output port $740_2$ is connected to a load device, and the USB output port $740_1$ is not connected to any load device. In certain examples, if the control chip 730 detects that the current $713_2$ flows out of the AC-to-DC conversion unit $710_2$ and the magnitude of the current $713_2$ is larger than the first predetermined threshold, the control chip 730 closes the switch 750. For example, the control chip 730 closes the switch 750 so that the AC-to-DC conversion unit $710_1$ also provides power to the USB output port $740_2$. As an example, the control chip 730 closes the switch 750 in order to reduce the magnitude of the current $713_2$ that flows out of the AC-to-DC conversion unit $710_2$. In some examples, if the control chip 730 detects that the current $713_1$ flows out of the AC-to-DC conversion unit $710_1$ but the magnitude of the current $713_1$ is smaller than the second predetermined threshold or detects that the current $713_1$ flows into the AC-to-DC conversion unit $710_1$, the control chip 730 opens the switch 750. For example, the second predetermined threshold is smaller than the first predetermined threshold. As an example, the control chip 730 opens the switch 750 in order to prevent and/or stop the current backflow into the AC-to-DC conversion unit $710_1$, and/or to prevent and/or stop the open-loop abnormality for the AC-to-DC conversion unit $710_1$.

In some embodiments, if the maximum output power for the AC-to-DC conversion unit $710_1$ is 30 watts and the maximum output power for the AC-to-DC conversion unit $710_2$ is also 30 watts, when one USB output port of the USB output ports $740_1$ and $740_2$ is connected to a load device and the other USB output port of the USB output ports $740_1$ and $740_2$ is not connected to any load device, the switch 750 is closed for power sharing between the AC-to-DC conversion unit $710_1$ and the AC-to-DC conversion unit $710_2$ so that the one USB output port that is connected to the load device can provide a maximum output power of 60 watts. In certain embodiments, if the maximum output power for the AC-to- DC conversion unit $710_1$ is 30 watts and the maximum output power for the AC-to-DC conversion unit $710_2$ is also 30 watts, when the USB output port $740_1$ is connected to a load device and the USB output port $740_2$ is also connected to a load device, the switch 750 is open so that the USB output port $740_1$ can provide a maximum output power of 30 watts and the USB output port $740_2$ can also provide a maximum output power of 30 watts.

In certain embodiments, if the maximum output power for the AC-to-DC conversion unit $710_1$ is 20 watts and the maximum output power for the AC-to-DC conversion unit $710_2$ is 40 watts, when one USB output port of the USB output ports $740_1$ and $740_2$ is connected to a load device and the other USB output port of the USB output ports $740_1$ and $740_2$ is not connected to any load device, the switch 750 is closed for power sharing between the AC-to-DC conversion unit $710_1$ and the AC-to-DC conversion unit $710_2$ so that the one USB output port that is connected to the load device can provide a maximum output power of 60 watts. In certain embodiments, if the maximum output power for the AC-to-DC conversion unit $710_1$ is 20 watts and the maximum output power for the AC-to-DC conversion unit $710_2$ is 40 watts, when the USB output port $740_1$ is connected to a load device and the USB output port $740_2$ is also connected to a load device, the switch 750 is open so that the USB output port $740_1$ can provide a maximum output power of 20 watts and the USB output port $740_2$ can provide a maximum output power of 40 watts.

As mentioned above and further emphasized here, FIG. 4 is merely an example, and FIG. 7 is also merely an example. These examples should not unduly limit the scope of the claims. One of ordinary skill in the art would recognize many variations, alternatives, and modifications. As an example, for the multiport USB charging system 400, n is equal to 3 so that the multiport USB charging system 400 is a three-port USB charging system that includes the AC-to-DC conversion units $410_1$, $410_2$ and $410_3$, the control chip 430, the USB output ports $440_1$, $440_2$ and $440_3$, the three switches 450, and the transistors $460_1$, $460_2$ and $460_3$. For example, the maximum output power for each AC-to-DC conversion unit of the AC-to-DC conversion units $410_1$, $410_2$ and $410_3$ is 30 watts.

In some examples, for the three-port USB charging system, if the maximum output power for each AC-to-DC conversion unit of the AC-to-DC conversion units $410_1$, $410_2$ and $410_3$ is 30 watts, when one USB output port of the USB output ports $440_1$, $440_2$ and $440_3$ is connected to a load device and the other two USB output ports of the USB output ports $440_1$, $440_2$ and $440_3$ are not connected to any load devices, two switches of the three switches 450 are closed and the other switch of the three switches 450 is open in order to implement power sharing, so that the one USB output port that is connected to the load device can provide a maximum output power of 90 watts. In certain examples, for the three-port USB charging system, if the maximum output power for each AC-to-DC conversion unit of the AC-to-DC conversion units $410_1$, $410_2$ and $410_3$ is 30 watts, when two USB output ports of the USB output ports $440_1$, $440_2$ and $440_3$ each are connected to a load device and the other USB output port of the USB output ports $440_1$, $440_2$ and $440_3$ is not connected to any load device, one switch of the three switches 450 is closed and the other two switches of the three switches 450 are open in order to implement power sharing, so that one USB output port of the two USB output ports that are connected to the load devices can provide a maximum output power of 60 watts, and the other USB output port of the two USB output ports that are connected to the load devices can provide a maximum output power of 30 watts. In some examples, for the three-port USB charging system, if the maximum output power for each AC-to-DC conversion unit of the AC-to-DC conversion units $410_1$, $410_2$ and $410_3$ is 30 watts, when the USB output ports $440_1$, $440_2$ and $440_3$ each are connected to a load device, the three switches 450 are all open to prevent and/or stop power sharing, so that the USB output ports $440_1$, $440_2$ and $440_3$ each can provide a maximum output power of 30 watts.

Figure 8:
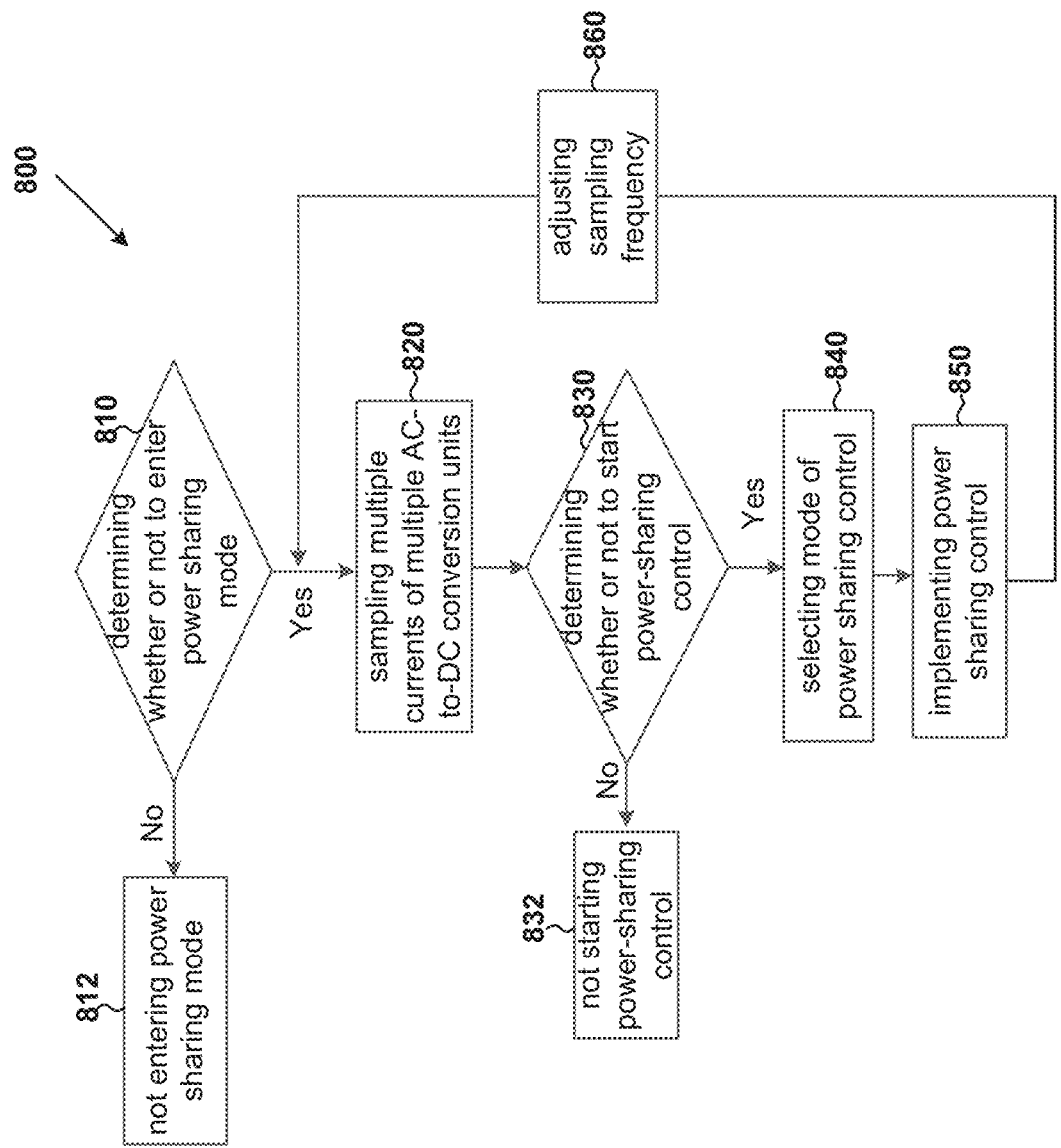
FIG. 8 is a simplified diagram showing a method for the multiport USB charging system as shown in FIG. 4 according to certain embodiments of the present invention.

FIG. 8 is a simplified diagram showing a method for the multiport USB charging system 400 as shown in FIG. 4 according to certain embodiments of the present invention. This diagram is merely an example, which should not unduly limit the scope of the claims. One of ordinary skill in the art would recognize many variations, alternatives, and modifications. The method 800 includes a process 810 for determining whether or not to enter power sharing mode, a process 812 for not entering power sharing mode, a process 820 for sampling multiple currents of multiple AC-to-DC conversion units, a process 830 for determining whether or not to start power-sharing control, a process 832 for not starting power-sharing control, a process 840 for selecting mode of power sharing control, a process 850 for implementing power sharing control, and a process 860 for adjusting sampling frequency. Although the above has been shown using a selected group of processes for the method 800, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 810, whether or not to enter power sharing mode is determined according to some embodiments. In certain examples, the multiport USB charging system 400 determines whether or not all of the multiple USB output ports $440_1$, $440_2$, . . . , and $440_n$ are connected to corresponding multiple load devices. For example, if all of the multiple USB output ports $440_1$, $440_2$, . . . , and $440_n$ are connected to the corresponding multiple load devices, the power sharing mode is not to be entered and the process 812 is to be performed. As an example, if one or more USB output ports of the multiple USB output ports $440_1$, $440_2$, . . . , and $440_n$ are not connected to any load devices, the power sharing mode is to be entered and the process 820 is to be performed.

At the process 812, the power sharing mode is not entered according to certain embodiments. For example, all of the one or more switches 450 remain open. At the process 820, the multiple currents of the multiple AC-to-DC conversion units $410_1$, $410_2$, . . . , and $410_n$ are sampled according to some embodiments. For example, the multiport USB charging system 400 samples the multiple currents of the multiple AC-to-DC conversion units $410_1$, $410_2$, . . . , and $410_n$ at a sampling frequency (e.g., at a set frequency).

At the process 830, whether or not to start power-sharing control is determined according to certain embodiments. For example, if none of the sampled multiple currents is larger than the first predetermined threshold, the power-sharing control is not to be started and the process 832 is to be performed. As an example, if at least one current (e.g., a current $413_m$) of the sampled multiple currents is larger than the first predetermined threshold, the power-sharing control is to be started and the process 840 is to be performed.

At the process 832, power-sharing control is not to be started according to some embodiments. For example, all of the one or more switches 450 remain open. At the process 840, a mode of power sharing control is selected according to certain embodiments. For example, one mode of power sharing control uses a constant voltage algorithm. As an example, another mode of power sharing control uses a current limiting algorithm.

At the process 850, the power sharing control is implemented with the selected mode of power sharing control according to certain embodiments. For example, the multiport USB charging system 400 determines which one or more DC voltages (e.g., the DC voltage $411_i$) and/or which one or more currents (e.g., the current $413_i$) of one or more AC-to-DC conversion units need to be adjusted, and then adjusts the one or more DC voltages (e.g., the DC voltage $411_i$) and/or the one or more currents (e.g., the current 413) with a step-by-step approach. In some examples, if one or more USB output ports of the multiple USB output ports $440_1, 440_2, \ldots,$ and $440_n$ are not connected to any load devices, the multiport USB charging system 400 enters the power sharing mode, and with power-sharing control, one or more AC-to-DC conversion units corresponding to the one or more USB output ports are connected to one or more additional AC-to-DC conversion units through one or more closed switches of the one or more switches 450 in order to provide power to one or more additional USB output ports that are connected to one or more load devices and corresponding to the one or more additional AC-to-DC conversion units.

At the process 860, the sampling frequency is adjusted according to some embodiments. For example, the multiport USB charging system 400 samples the multiple currents of the multiple AC-to-DC conversion units $410_1, 410_2, \ldots,$ and $410_n$ at the sampling frequency.

As discussed above and further emphasized here, FIG. 8 is merely an example, which should not unduly limit the scope of the claims. One of ordinary skill in the art would recognize many variations, alternatives, and modifications. In certain examples, after the one or more switches of the one or more switches 450 are closed at the process 850, if at least one current (e.g., a current $413_k$) of at least one AC-to-DC conversion unit (e.g., a AC-to-DC conversion unit $410_k$) of the one or more AC-to-DC conversion units flow into the at least one AC-to-DC conversion unit (e.g., the AC-to-DC conversion unit $410_k$), or flow out of the at least one AC-to-DC conversion unit (e.g., the AC-to-DC conversion unit $410_k$) but at least the magnitude of the at least one current (e.g., the current $413_k$) is smaller than the second predetermined threshold, all one or more switches that are connected to the at least one AC-to-DC conversion unit (e.g., the AC-to-DC conversion unit $410_k$) are open, wherein k is an integer larger than or equal to 1 and smaller than or equal to n.

Certain embodiments of the present invention provide a multiport USB charging system (e.g., the multiport USB charging system 400) that can adjust the sampling frequency for the power sharing control in order to achieve desired precision of the power sharing among multiple AC-to-DC conversion units (e.g., the multiple AC-to-DC conversion units $410_1, 410_2, \ldots,$ and $410_n$). For example, the multiport USB charging system (e.g., the multiport USB charging system 400) can improve the precision of the power sharing among the multiple AC-to-DC conversion units without significantly increasing resources needed for the control chip (e.g., the control chip 430). As an example, the multiport USB charging system (e.g., the multiport USB charging system 400) can improve the precision of the power sharing among the multiple AC-to-DC conversion units without lowering energy efficiency of the multiport USB charging system (e.g., the multiport USB charging system 400). As an example, if the voltage-regulation step of the control chip 430 is 10 mV, the on-resistance of each switch of the one or more switches 450 is 10 mΩ, and the closed-loop bandwidth of each AC-to-DC conversion unit of the multiple AC-to-DC conversion units $410_1, 410_2, \ldots,$ and $410_n$ is 10 KHz, the current difference between the multiple AC-to-DC conversion units can be reduced to within 0.1 A by setting the sampling frequency to slightly less than 10 kHz.

Some embodiments of the present invention provide a multiport USB charging system (e.g., the multiport USB charging system 400) that has a satisfactory dynamic response. Certain embodiments of the present invention provide a multiport USB charging system (e.g., the multiport USB charging system 400) that can prevent and/or stop the current backflow and/or the open-loop abnormality. Some embodiments of the present invention provide a multiport USB charging system (e.g., the multiport USB charging system 400) that has a fast communication rate. Certain embodiments of the present invention provide a multiport USB charging system (e.g., the multiport USB charging system 400) that is not susceptible to electric and/or magnetic interferences.

According to certain embodiments, a USB charging system includes: a first AC-to-DC conversion unit configured to generate a first voltage and a first current; a second AC-to-DC conversion unit configured to generate a second voltage and a second current; a first USB output port corresponding to the first AC-to-DC conversion unit; a second USB output port corresponding to the second AC-to-DC conversion unit; a switch connected to the first AC-to-DC conversion unit and the second AC-to-DC conversion unit; and a control chip connected to the first AC-to-DC conversion unit and the second AC-to-DC conversion unit and configured to open the switch and close the switch; wherein the control chip is further configured to: determine whether the first USB output port is connected to a load device and whether the second USB output port is connected to a load device; if the first USB output port is connected to a load device and the second USB output port is not connected to any load device, sample the first current of the first AC-to-DC conversion unit; determine whether the first current flows out of the first AC-to-DC conversion unit and if the first current flows out of the first AC-to-DC conversion unit, whether the first current is larger than a first predetermined threshold in magnitude; and if the first current flows out of the first AC-to-DC conversion unit and the first current is larger than the first predetermined threshold in magnitude, close the switch. For example, the USB charging system is implemented according to at least FIG. 4.

As an example, the control chip is further configured to, if the first USB output port is connected to a load device and the second USB output port is not connected to any load device, if the first current flows out of the first AC-to-DC conversion unit and the first current is larger than the first predetermined threshold in magnitude, adjust the first current and the second current. For example, the control chip is further configured to, if the first USB output port is connected to a load device and the second USB output port is not connected to any load device, if the first current flows out of the first AC-to-DC conversion unit and the first current is larger than the first predetermined threshold in magnitude, adjust the first voltage and the second voltage. As an example, the control chip is further configured to, if the first USB output port is connected to a load device and the second USB output port is not connected to any load device, sample the second current of the second AC-to-DC conversion unit; determine whether the second current flows into the second AC-to-DC conversion unit and if the second current flows out of the second AC-to-DC conversion unit, whether the second current is smaller than a second predetermined threshold in magnitude; if the second current flows into the second AC-to-DC conversion unit, open the switch; and if the second current flows out of the second AC-to-DC conversion unit and the second current is smaller than the second predetermined threshold in magnitude, open the switch. For example, the second predetermined threshold is smaller than the first predetermined threshold.

As an example, the control chip is further configured to, if the first USB output port is connected to a load device and the second USB output port is not connected to any load device, communicate with the load device using a fast-charging protocol; and determine an output power of the first USB output port. For example, the control chip is further configured to, if the first USB output port is connected to a load device and the second USB output port is not connected to any load device, sample the first current of the first AC-to-DC conversion unit at a sampling frequency. As an example, the control chip is further configured to, if the first USB output port is connected to a load device and the second USB output port is not connected to any load device, adjust the sampling frequency.

According to some embodiments, a controller for a USB charging system includes: an output port detection unit configured to determine whether a first USB output port is connected to a load device and whether a second USB output port is connected to a load device, the first USB output port corresponding to a first AC-to-DC conversion unit, the second USB output port corresponding to a second AC-to-DC conversion unit; a sampling unit configured to, if the first USB output port is connected to a load device and the second USB output port is not connected to any load device, sample a first current generated by the first AC-to-DC conversion unit; a power-sharing control unit configured to determine whether the first current flows out of the first AC-to-DC conversion unit and if the first current flows out of the first AC-to-DC conversion unit, whether the first current is larger than a first predetermined threshold in magnitude; a switch management unit configured to, if the first current flows out of the first AC-to-DC conversion unit and the first current is larger than the first predetermined threshold in magnitude, close a switch connected to the first AC-to-DC conversion unit and the second AC-to-DC conversion unit. For example, the controller for the USB charging system is implemented according to at least FIG. 6.

As an example, the controller further includes an output control unit configured to, if the first USB output port is connected to a load device and the second USB output port is not connected to any load device and if the first current flows out of the first AC-to-DC conversion unit and the first current is larger than the first predetermined threshold in magnitude, adjust the first current and a second current generated by the second AC-to-DC conversion unit. For example, the controller further includes an output control unit configured to, if the first USB output port is connected to a load device and the second USB output port is not connected to any load device and if the first current flows out of the first AC-to-DC conversion unit and the first current is larger than the first predetermined threshold in magnitude, adjust a first voltage generated by the first AC-to-DC conversion unit and a second voltage generated by the second AC-to-DC conversion unit. As an example, the controller further includes an output control unit configured to, if the first USB output port is connected to a load device and the second USB output port is not connected to any load device and if the first current flows out of the first AC-to-DC conversion unit and the first current is larger than the first predetermined threshold in magnitude, adjust a first output power provided by the first AC-to-DC conversion unit and a second output power provided by the second AC-to-DC conversion unit.

For example, the sampling unit is further configured to, if the first USB output port is connected to a load device and the second USB output port is not connected to any load device, sample the second current of the second AC-to-DC conversion unit; and the power-sharing control unit is further configured to determine whether the second current flows into the second AC-to-DC conversion unit and if the second current flows out of the second AC-to-DC conversion unit, whether the second current is smaller than a second predetermined threshold in magnitude. As an example, the controller further includes a protection unit configured to: if the second current flows into the second AC-to-DC conversion unit, send a control signal to the switch management unit to open the switch; and if the second current flows out of the second AC-to-DC conversion unit and the second current is smaller than the second predetermined threshold in magnitude, send the control signal to the switch management unit to open the switch. For example, the controller further includes a protocol unit configured to, if the first USB output port is connected to a load device and the second USB output port is not connected to any load device, communicate with the load device using a charging protocol; and determine an output power of the first USB output port.

According to some embodiments, a method for USB charging includes: determining whether a first USB output port is connected to a load device and whether a second USB output port is connected to a load device, the first USB output port corresponding to a first AC-to-DC conversion unit, the second USB output port corresponding to a second AC-to-DC conversion unit; and if the first USB output port is connected to a load device and the second USB output port is not connected to any load device, sampling a first current generated by the first AC-to-DC conversion unit; determining whether the first current flows out of the first AC-to-DC conversion unit and if the first current flows out of the first AC-to-DC conversion unit, whether the first current is larger than a first predetermined threshold in magnitude; and if the first current flows out of the first AC-to-DC conversion unit and the first current is larger than the first predetermined threshold in magnitude, closing a switch connected to the first AC-to-DC conversion unit and the second AC-to-DC conversion unit. For example, the method for USB charging is implemented according to FIG. 8.

As an example, the method further includes: if the first USB output port is connected to a load device and the second USB output port is not connected to any load device and if the first current flows out of the first AC-to-DC conversion unit and the first current is larger than the first predetermined threshold in magnitude, adjusting the first current and a second current generated by the second AC-to-DC conversion unit. For example, the method further includes: if the first USB output port is connected to a load device and the second USB output port is not connected to any load device and if the first current flows out of the first AC-to-DC conversion unit and the first current is larger than the first predetermined threshold in magnitude, adjusting a first voltage generated by the first AC-to-DC conversion unit and a second voltage generated by the second AC-to-DC conversion unit. As an example, the method further includes: if the first USB output port is connected to a load device and the second USB output port is not connected to any load device and if the first current flows out of the first AC-to-DC conversion unit and the first current is larger than the first predetermined threshold in magnitude, adjusting a first power provided by the first AC-to-DC conversion unit and a second power provided by the second AC-to-DC conversion unit.

For example, the method further includes: if the first USB output port is connected to a load device and the second USB output port is not connected to any load device, sampling the second current of the second AC-to-DC conversion unit; and determining whether the second current flows into the second AC-to-DC conversion unit and if the second current flows out of the second AC-to-DC conversion unit, whether the second current is smaller than a second predetermined threshold in magnitude. As an example, the method further includes: if the second current flows into the second AC-to-DC conversion unit, opening the switch; and if the second current flows out of the second AC-to-DC conversion unit and the second current is smaller than the second predetermined threshold in magnitude, opening the switch. For example, the method further includes: if the first USB output port is connected to a load device and the second USB output port is not connected to any load device, communicating with the load device using a charging protocol; and determining an output power of the first USB output port.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A USB charging system, the charging system comprising:
    a first AC-to-DC conversion unit configured to generate a first voltage and a first current;
    a second AC-to-DC conversion unit configured to generate a second voltage and a second current;
    a first USB output port corresponding to the first AC-to-DC conversion unit;
    a second USB output port corresponding to the second AC-to-DC conversion unit;
    a switch connected to the first AC-to-DC conversion unit and the second AC-to-DC conversion unit; and
    a control chip connected to the first AC-to-DC conversion unit and the second AC-to- DC conversion unit and configured to open the switch and close the switch;
    wherein the control chip is further configured to:
        determine whether the first USB output port is connected to a first load device and whether the second USB output port is connected to a second load device;
        if the first USB output port is connected to the first load device and the second USB output port is not connected to the second load device,
            sample the first current of the first AC-to-DC conversion unit;
            determine whether the first current flows out of the first AC-to-DC conversion unit;
            if the first current flows out of the first AC-to-DC conversion unit, determine whether the first current is larger than a first predetermined threshold in magnitude; and
            if the first current flows out of the first AC-to-DC conversion unit and the first current is larger than the first predetermined threshold in magnitude, close the switch.

2. The USB charging system of claim 1 wherein the control chip is further configured to, if the first USB output port is connected to the first load device and the second USB output port is not connected to the second load device and if the first current flows out of the first AC-to-DC conversion unit and the first current is larger than the first predetermined threshold in magnitude, adjust the first current and the second current.

3. The USB charging system of claim 1 wherein the control chip is further configured to, if the first USB output port is connected to the first load device and the second USB output port is not connected to the second load device and if the first current flows out of the first AC-to-DC conversion unit and the first current is larger than the first predetermined threshold in magnitude, adjust the first voltage and the second voltage.

4. The USB charging system of claim 1 wherein the control chip is further configured to, if the first USB output port is connected to the first load device and the second USB output port is not connected to the second load device,
    sample the second current of the second AC-to-DC conversion unit;
    determine whether the second current flows into the second AC-to-DC conversion unit;
    if the second current flows out of the second AC-to-DC conversion unit, determine whether the second current is smaller than a second predetermined threshold in magnitude;
    if the second current flows into the second AC-to-DC conversion unit, open the switch; and
    if the second current flows out of the second AC-to-DC conversion unit and the second current is smaller than the second predetermined threshold in magnitude, open the switch.

5. The USB charging system of claim 4 wherein the second predetermined threshold is smaller than the first predetermined threshold.

6. The USB charging system of claim 1 wherein the control chip is further configured to, if the first USB output port is connected to the first load device and the second USB output port is not connected to the second load device,
    communicate with the first load device using a fast-charging protocol; and
    determine an output power of the first USB output port.

7. The USB charging system of claim 1 wherein the control chip is further configured to, if the first USB output port is connected to the first load device and the second USB output port is not connected to the second load device, sample the first current of the first AC-to-DC conversion unit at a sampling frequency.

8. The USB charging system of claim 7 wherein the control chip is further configured to, if the first USB output port is connected to the first load device and the second USB output port is not connected to the second load device, adjust the sampling frequency.

9. A controller for a USB charging system, the controller comprising:
an output port detection unit configured to determine whether a first USB output port is connected to a first load device and whether a second USB output port is connected to a second load device, the first USB output port corresponding to a first AC-to-DC conversion unit, the second USB output port corresponding to a second AC-to-DC conversion unit;
a sampling unit configured to, if the first USB output port is connected to the first load device and the second USB output port is not connected to the second load device, sample a first current generated by the first AC-to-DC conversion unit;
a power-sharing control unit configured to determine whether the first current flows out of the first AC-to-DC conversion unit and if the first current flows out of the first AC-to-DC conversion unit, determine whether the first current is larger than a first predetermined threshold in magnitude; and
a switch management unit configured to, if the first current flows out of the first AC-to-DC conversion unit and the first current is larger than the first predetermined threshold in magnitude, close a switch connected to the first AC-to-DC conversion unit and the second AC-to-DC conversion unit.

10. The controller of claim 9, and further comprising an output control unit configured to, if the first USB output port is connected to the first load device and the second USB output port is not connected to the second load device and if the first current flows out of the first AC-to-DC conversion unit and the first current is larger than the first predetermined threshold in magnitude, adjust the first current and a second current generated by the second AC-to-DC conversion unit.

11. The controller of claim 9, and further comprising an output control unit configured to, if the first USB output port is connected to the first load device and the second USB output port is not connected to the second load device and if the first current flows out of the first AC-to-DC conversion unit and the first current is larger than the first predetermined threshold in magnitude, adjust a first voltage generated by the first AC-to-DC conversion unit and a second voltage generated by the second AC-to-DC conversion unit.

12. The controller of claim 9, and further comprising an output control unit configured to, if the first USB output port is connected to the first load device and the second USB output port is not connected to the second load device and if the first current flows out of the first AC-to-DC conversion unit and the first current is larger than the first predetermined threshold in magnitude, adjust a first output power provided by the first AC-to-DC conversion unit and a second output power provided by the second AC-to-DC conversion unit.

13. The controller of claim 9 wherein:
the sampling unit is further configured to, if the first USB output port is connected to the first load device and the second USB output port is not connected to the second load device, sample a second current of the second AC-to-DC conversion unit; and
the power-sharing control unit is further configured to determine whether the second current flows into the second AC-to-DC conversion unit and if the second current flows out of the second AC-to-DC conversion unit, determine whether the second current is smaller than a second predetermined threshold in magnitude.

14. The controller of claim 13, and further comprising a protection unit configured to:
if the second current flows into the second AC-to-DC conversion unit, send a control signal to the switch management unit to open the switch; and
if the second current flows out of the second AC-to-DC conversion unit and the second current is smaller than the second predetermined threshold in magnitude, send the control signal to the switch management unit to open the switch.

15. The controller of claim 9, and further comprising a protocol unit configured to, if the first USB output port is connected to the first load device and the second USB output port is not connected to the second load device,
communicate with the first load device using a charging protocol; and
determine an output power of the first USB output port.

16. A method for USB charging, the method comprising:
determining whether a first USB output port is connected to a first load device and whether a second USB output port is connected to a second load device, the first USB output port corresponding to a first AC-to-DC conversion unit, the second USB output port corresponding to a second AC-to-DC conversion unit; and
if the first USB output port is connected to the first load device and the second USB output port is not connected to the second load device,
sampling a first current generated by the first AC-to-DC conversion unit;
determining whether the first current flows out of the first AC-to-DC conversion unit;
if the first current flows out of the first AC-to-DC conversion unit, determining whether the first current is larger than a first predetermined threshold in magnitude; and
if the first current flows out of the first AC-to-DC conversion unit and the first current is larger than the first predetermined threshold in magnitude, closing a switch connected to the first AC-to-DC conversion unit and the second AC-to-DC conversion unit.

17. The method of claim 16, and further comprising:
if the first USB output port is connected to the first load device and the second USB output port is not connected to the second load device and if the first current flows out of the first AC-to-DC conversion unit and the first current is larger than the first predetermined threshold in magnitude, adjusting the first current and a second current generated by the second AC-to-DC conversion unit.

18. The method of claim 16, and further comprising:
if the first USB output port is connected to the first load device and the second USB output port is not connected to the second load device and if the first current flows out of the first AC-to-DC conversion unit and the first current is larger than the first predetermined threshold in magnitude, adjusting a first voltage generated by the first AC-to-DC conversion unit and a second voltage generated by the second AC-to-DC conversion unit.

19. The method of claim 16, and further comprising:
if the first USB output port is connected to the first load device and the second USB output port is not connected to the second load device and if the first current flows out of the first AC-to-DC conversion unit and the first current is larger than the first predetermined threshold in magnitude, adjusting a first power provided by the first AC-to-DC conversion unit and a second power provided by the second AC-to-DC conversion unit.

20. The method of claim 16, and further comprising:
if the first USB output port is connected to the first load device and the second USB output port is not connected to the second load device, sampling a second current of the second AC-to-DC conversion unit;
determining whether the second current flows into the second AC-to-DC conversion unit; and
if the second current flows out of the second AC-to-DC conversion unit, determining whether the second current is smaller than a second predetermined threshold in magnitude.

21. The method of claim 20, and further comprising:
if the second current flows into the second AC-to-DC conversion unit, opening the switch; and
if the second current flows out of the second AC-to-DC conversion unit and the second current is smaller than the second predetermined threshold in magnitude, opening the switch.

22. The method of claim 16, and further comprising:
if the first USB output port is connected to the first load device and the second USB output port is not connected to the second load device,
communicating with the first load device using a charging protocol; and
determining an output power of the first USB output port.

* * * * *